(12) United States Patent
Stippick et al.

(10) Patent No.: US 6,587,196 B1
(45) Date of Patent: Jul. 1, 2003

(54) OSCILLATING MECHANISM DRIVEN MONOCHROMATOR

(75) Inventors: Tim Stippick, Phoenix, AZ (US); George Acosta, Phoenix, AZ (US); Ken Meissner, Gilbert, AZ (US)

(73) Assignee: Sensys Medical, Inc., Chandler, AZ (US)

( * ) Notice: Subject to any disclaimer, the term of this patent is extended or adjusted under 35 U.S.C. 154(b) by 0 days.

(21) Appl. No.: 09/491,350

(22) Filed: Jan. 26, 2000

(51) Int. Cl.⁷ .............................. G01J 3/06; G01J 3/18
(52) U.S. Cl. ................................ 356/308; 356/334
(58) Field of Search ................................. 356/334, 308, 356/326, 331

(56) References Cited

U.S. PATENT DOCUMENTS

| | | | |
|---|---|---|---|
| 3,733,131 A | * 5/1973 | Mould | 356/323 |
| 3,877,818 A | 4/1975 | Button et al. | 356/186 |
| 4,285,596 A | 8/1981 | Landa | 356/308 |
| 4,315,691 A | 2/1982 | Perkins et al. | 356/331 |
| 4,329,051 A | 5/1982 | Chamran et al. | 356/320 |
| 4,560,276 A | 12/1985 | Yoshioka | 356/334 |
| 4,991,934 A | 2/1991 | Hettrick | 350/162.21 |
| 5,767,965 A | * 6/1998 | Zhou et al. | 356/328 |
| 6,034,767 A | * 3/2000 | Yoshikawa | 356/308 |

* cited by examiner

*Primary Examiner*—Zandra V. Smith
(74) *Attorney, Agent, or Firm*—Glenn Patent Group; Michael A. Glenn; Kirk D. Wong

(57) ABSTRACT

The invention provides a mechanism for oscillating the spectral grating of a monochromator. The mechanism couples the spectral grating of the monochromator to an oscillating spatial linkage mechanism which accepts a rotational input and converts it into an oscillatory motion. A monochromator according to the invention comprises an oscillating grating that is oscillated by such spacial linkage mechanism drive.

29 Claims, 13 Drawing Sheets

OSCILLATING MECHANISM DRIVEN MONOCHROMATOR

BACKGROUND OF THE INVENTION

1. Technical Field

The invention relates to devices for isolating a narrow portion of a spectrum. More particularly, the invention relates to an oscillating mechanism driven monochromator.

2. Description of the Prior Art

A monochromator is an optical instrument that is designed to separate polychromatic white light (i.e. light consisting of more than one color or wavelength) into monochromatic light (i.e. light of a single color). State of the art monochromators typically use a Czerny-Turner optical system (see FIG. 1). Light enters an entrance slit 11 and is collected by the collimating mirror 13. Collimated light strikes a grating 15 and is dispersed into individual wavelengths (i.e. colors). Each wavelength leaves the grating at a different angle and is re-imaged at the exit slit 17 by a focusing mirror 19. Because each wavelength images at a different horizontal position, only the wavelength imaged at the exit slit opening is allowed to exit the monochromator. Varying the width of the entrance and exit slits allows more (or fewer) wavelengths of light to exit the system.

Rotating the diffraction grating scans wavelengths across the exit slit opening. The monochromatic light produced by a monochromator can be used to illuminate a sample, or it can be scanned across a detector and measured for intensity at individual wavelengths. Conventional monochromators use an oscillating grating to perform such spectral separation. The grating is typically oscillated by a drive mechanism.

There are presently three types of drive mechanisms commonly used in monochromators.

FIG. 2 shows a conventional sine drive scanning system with precision drive screw 21, drive block 23, and sine bar 25. In such drive mechanism, a motor 27 turns a drive screw which moves a drive block which, in turn, pushes the sine bar to rotate the grating.

FIG. 3 shows a direct digital scanning system with worm/worm gear arrangement. In this drive mechanism, a stepping motor 37 turns a worm gear mechanism 31 which rotates a grating turret 33 a full 360°, thereby allowing for wavelength scanning and grating changes.

FIG. 4 shows a direct digital scanning system that rotates the grating about its face (on-axis). In this drive mechanism, a motor 47 turns a worm gear 41 to change wavelengths. A second motor or complex mechanical arrangement 45 changes the gratings.

Various problems stem from the use of such mechanisms. One such problem is the issue of position repeatability of the grating's zero order position. Another problem with such mechanisms is the dependency of the torque profile on direction. The sine bar mechanism also requires that the drive motor be reversible to produce the oscillation of the grating, while the direct digital scanning system is unnecessarily complex.

Rather than using the above mechanisms to produce the oscillation of the grating, some monochromators incorporate a direct coupling of a reversing motor to the grating. This design requires that the motor be reversible and have high torque characteristics.

Such state of the art monochromators lack stability and accuracy and require high torque drive motors. While this is not a problem for some applications, it a serious limitation for applications where such imperfections in the monochromator drive mechanism add a significant amount of noise to a signal developed with the monochromator, for example where the monochromator is a signal source in an instrument for noninvasive measurement of blood analytes.

It would be advantageous to provide a monochromator that overcomes the deficiencies known in state of the art devices, especially with regard to the use of such monochromators in precision applications.

SUMMARY OF THE INVENTION

The invention provides a mechanism for oscillating the spectral grating of a monochromator. The mechanism couples the spectral grating of the monochromator to an oscillating spatial linkage mechanism which accepts a rotational input and converts it into an oscillatory motion. A monochromator according to the invention comprises an oscillating grating that is oscillated by such spatial linkage mechanism drive.

DETAILED DESCRIPTION OF THE INVENTION

Figure 1:
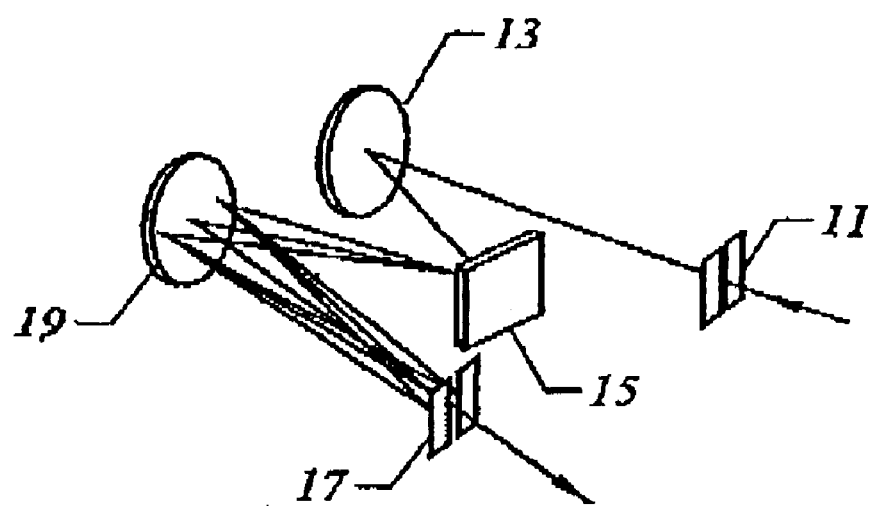
FIG. 1 is a schematic diagram showing a monochromator incorporating a Czerny-Turner optical system.
Figure 2:
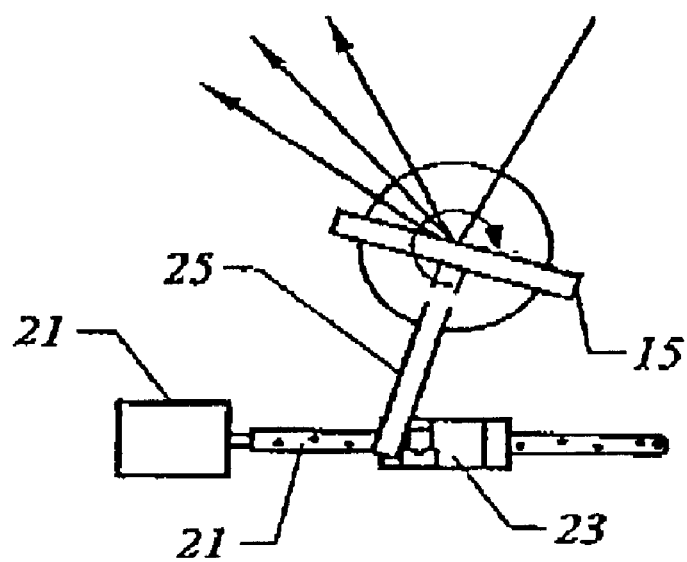
FIG. 2 is a schematic diagram showing a conventional sine drive scanning system.
Figure 3:
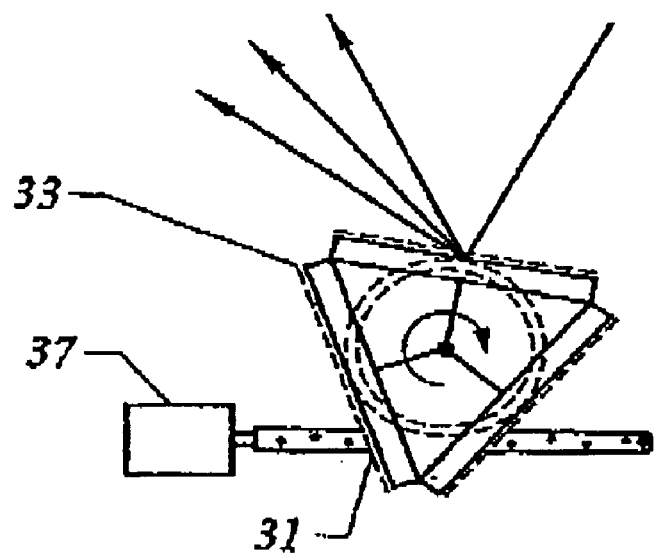
FIG. 3 is a schematic diagram showing a direct digital scanning system.
Figure 4:
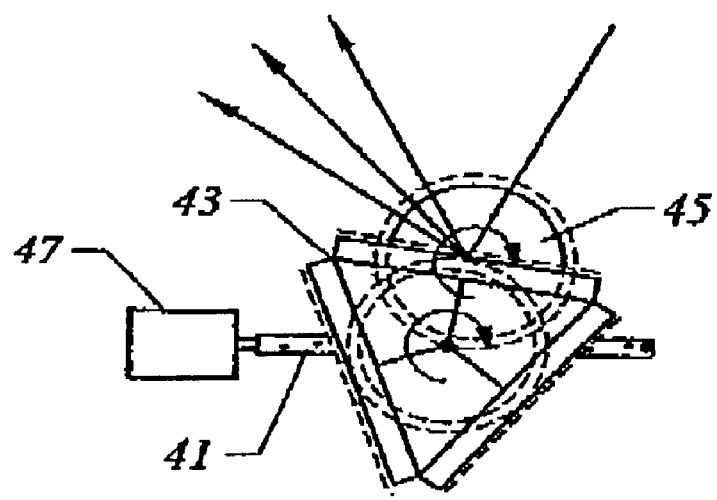
FIG. 4 is a schematic diagram showing a direct digital scanning system.
Figure 5:
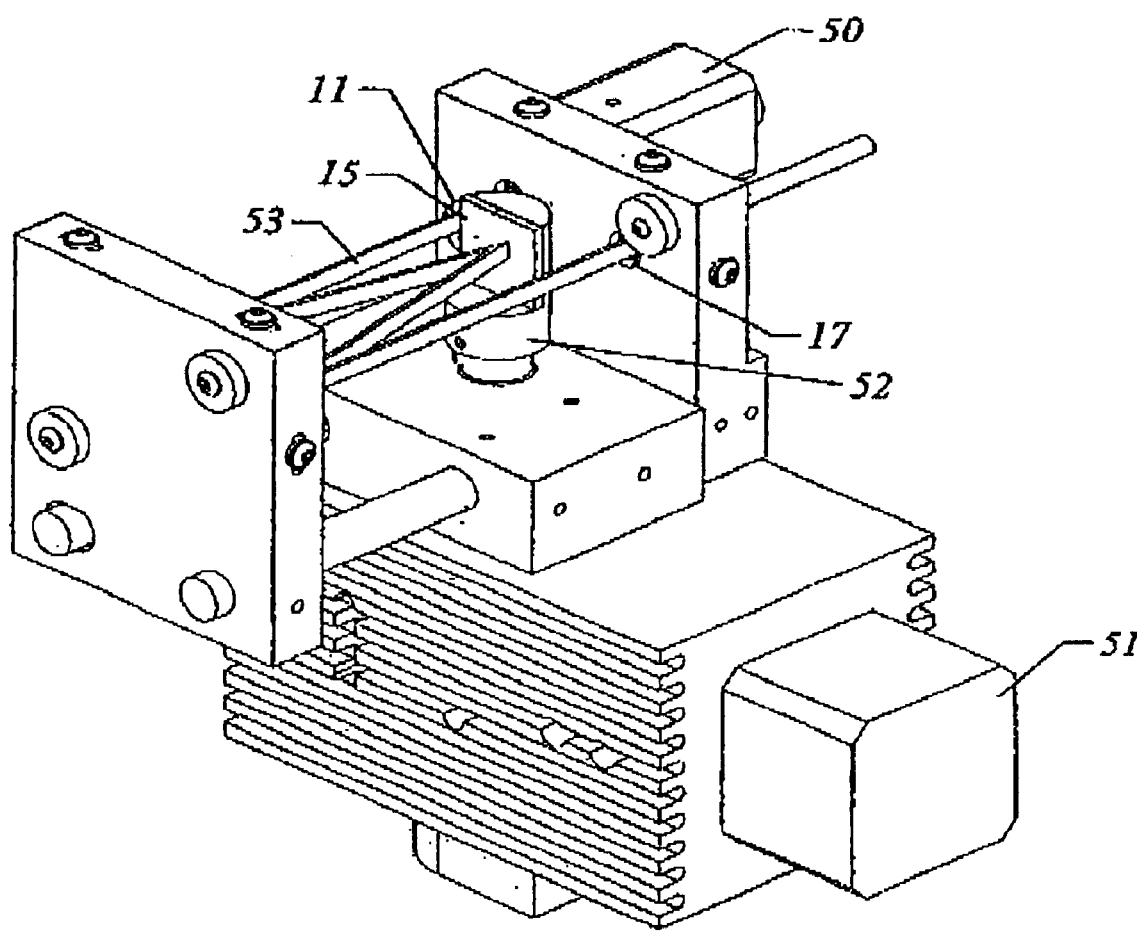
FIG. 5 is an isometric view of an oscillating mechanism monochromator according to the invention.

FIG. 5 is an isometric view of an oscillating mechanism monochromator according to the invention. In FIG. 5, light 53 from a light source 50 enters an entrance slit 11 and is collected by the collimating mirror (not shown, refer to FIG. 1). Collimated light strikes a grating 15 and is dispersed into individual wavelengths (i.e. colors). Each wavelength leaves the grating at a different angle and is re-imaged at the exit slit 17 by a focusing mirror (not shown, refer to FIG. 1). The grating is mounted to an oscillating member 52 that has a planar surface formed transaxially thereon at an upper end thereof and adapted to receive the grating. The grating is affixed thereto by known techniques. The grating itself may be any suitable grating for the application to which the invention is put, as is known to those skilled in the art. The oscillating member is formed at or mounted to one end of a drive shaft (see FIGS. 6–15) which is oscillated by an oscillating spatial mechanism (shown on FIGS. 6–15 and discussed in detail below) which, in turn, is driven by a motor 51. For the purposes of the preferred embodiment of the invention, the motor is a stepper motor (400 step/revolution), although any suitable motor be used in the present invention, as will be appreciated by those skilled in the art. For example a motor can be chosen that has an inertial damper coupled to the shaft of a double shafted motor to reduce motor vibration. Further, while a particular arrangement of the monochromator components is shown in the figures, it will be appreciated by those skilled in the art that the actual arrangement of such components is a matter of choice and is dictated by the application to which the invention is put.

Figure 6:
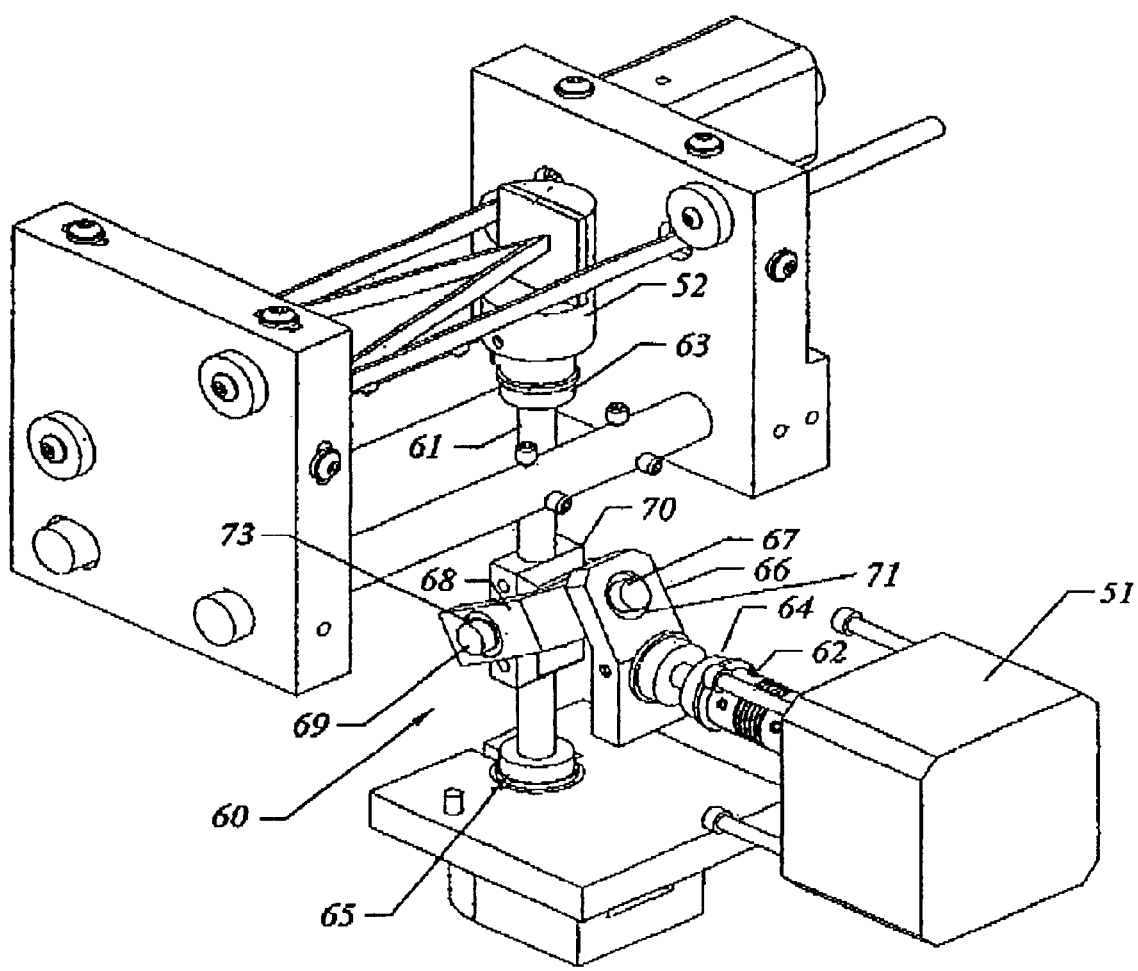
FIG. 6 is a cutaway isometric view of an oscillating mechanism monochromator according to the invention.

FIG. 6 is a cutaway isometric view of an oscillating mechanism monochromator according to the invention. In FIG. 6, a ruled spectral grating component 15 is coupled to an oscillating spatial mechanism 60. As discussed above, the grating is affixed to an oscillating member which, in turn, is formed on or attached to a drive shaft 61. The drive shaft is operated by a spatial mechanism which, in turn, is driven by the motor 51 via the motor shaft. Various bushings or bearings are provided to permit smooth and reliable operation of the mechanism, e.g. a motor shaft bushing 64 and upper and lower driver shaft bushings 63, 65, respectively (which also includes a harmonic balancer 80 in the opposite side of the motor shaft).

The spatial mechanism 60 comprises an off axis motor shaft coupler 66 (which is also a harmonic balancer for the spatial mechanism of the motor), i.e. the motor shaft coupler defines an aperture 71 that is off axis from the axis of the motor shaft. As can be seen in FIG. 6, the motor shaft coupler is bent away from the motor at an angle, which in the presently preferred embodiment of the invention is 30 degrees. Those skilled in the art will appreciate that other angles may be used in various embodiments of the invention.

The motor shaft coupler is connected to a link 68 via a cylindrical projection 67 that is formed on the link and that is engaged with the aperture of the motor shaft coupler. The projection and aperture are arranged to move freely, one relative to the other. The motor shaft coupler aperture should therefore be large enough to acomodate a full range of motion of the projection during operation of the mechanism. A bushing or bearing may be provided to reduce friction between the link and the motor shaft coupler at a projection/aperture interface.

The link itself is preferably a U-shaped member and further comprises an aperture 73 defined in each projecting segment of the U. Thus, in addition to providing the projection 67 for engagement with the drive shaft coupler, the link is configured to receive opposing, cylindircal projections 69 that are formed on a drive shaft coupler 70. The drive shaft coupler is affixed to, or formed integrally with, the drive shaft. The link apertures should be large enough to acomodate a full range of motion of the projection during operation of the mechanism. A bushing or bearing may be provided to reduce friction between the link and the drive shaft coupler at a projection/aperture interface.

In operation, a rotational input with a stated angular velocity profile is imparted to the motor shaft coupler of the oscillating spatial mechanism by rotation of the motor shaft, as driven by the motor. As a result, the stated mechanism drive shaft coupler (and therefore the drive shaft) oscillates through one complete forward and reverse cycle for every one revolution of the motor shaft coupler. The number of oscillations of the grating is dictated by the geometry of the spatial mechanism. This mechanism causes the grating to oscillate in a forward and reverse direction of 60 degrees each direction (totaling 120 degrees) per input revolution. The angle of oscillation is determined by the geometry of the spatial mechanism used. The geometry of the presently preferred spatial mechanism can be altered to allow the grating to oscillate between 0 and 180 degrees.

Figure 7:
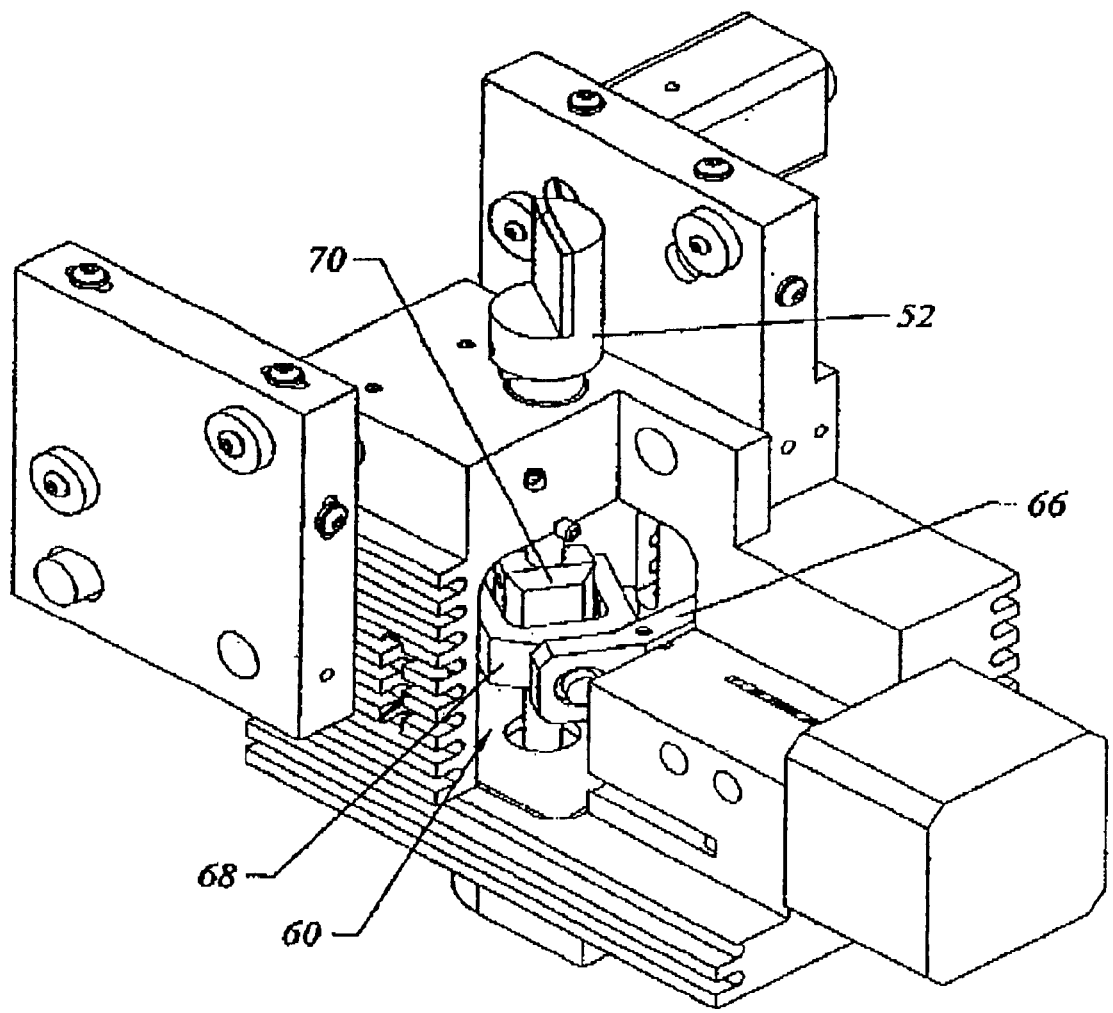
FIG. 7 is a cutaway isometric view of an oscillating mechanism monochromator in an initial position, showing clockwise input rotation, according to the invention.

FIG. 7 is a cutaway isometric view of an oscillating mechanism monochromator in an initial position, showing clockwise input rotation, according to the invention. In FIG. 7, it can be seen that the link 68 and motor shaft coupler 66 are in a substantially horizontal position.

Figure 8:
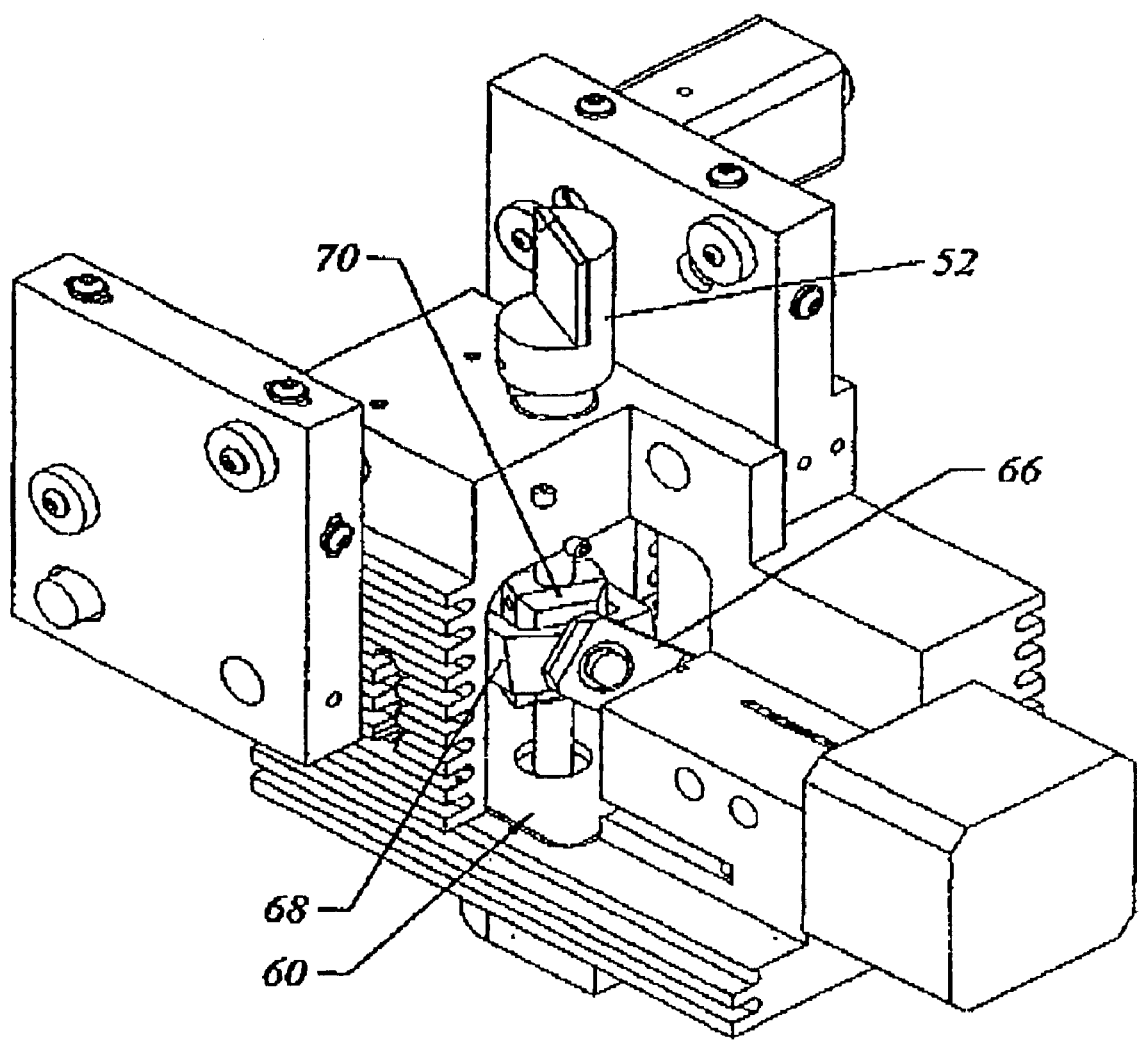
FIG. 8 is a cutaway isometric view of an oscillating mechanism monochromator in a second position, showing clockwise input rotation, according to the invention.

FIG. 8 is a cutaway isometric view of an oscillating mechanism monochromator in a second position, showing clockwise input rotation, according to the invention. In FIG. 8, it can be seen that the motor shaft coupler is rotated upwardly. This movement, in turn, lifts the link.

Figure 9:
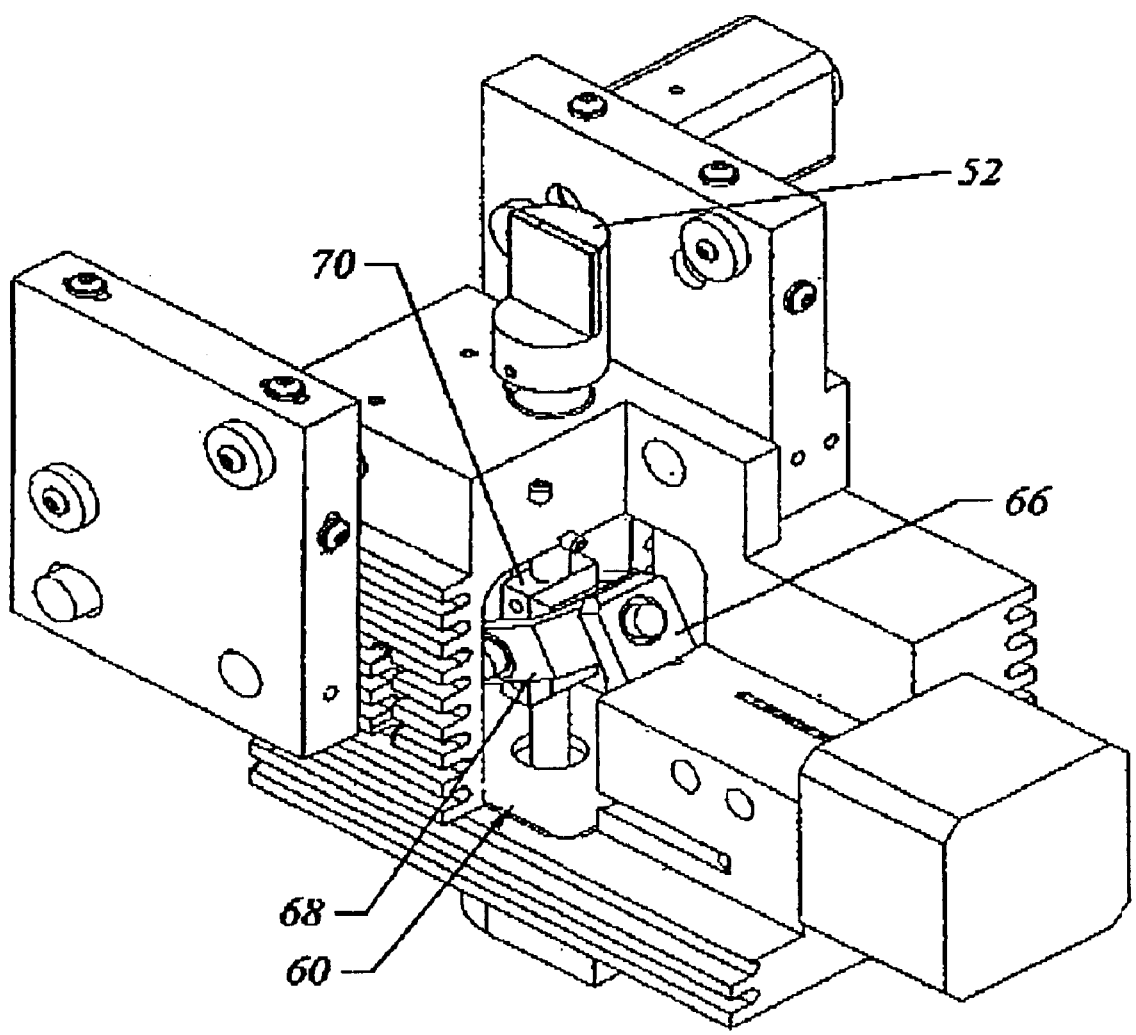
FIG. 9 is a cutaway isometric view of an oscillating mechanism monochromator in a third position, showing clockwise input rotation, according to the invention.

FIG. 9 is a cutaway isometric view of an oscillating mechanism monochromator in a third position, showing clockwise input rotation, according to the invention. In FIG. 9, it can be seen that the motor shaft coupler is in a substantially vertical position, the link is lifted vertically by the motor shaft coupler and pulled sideways, thereby rotating the grating in a first direction.

Figure 10:
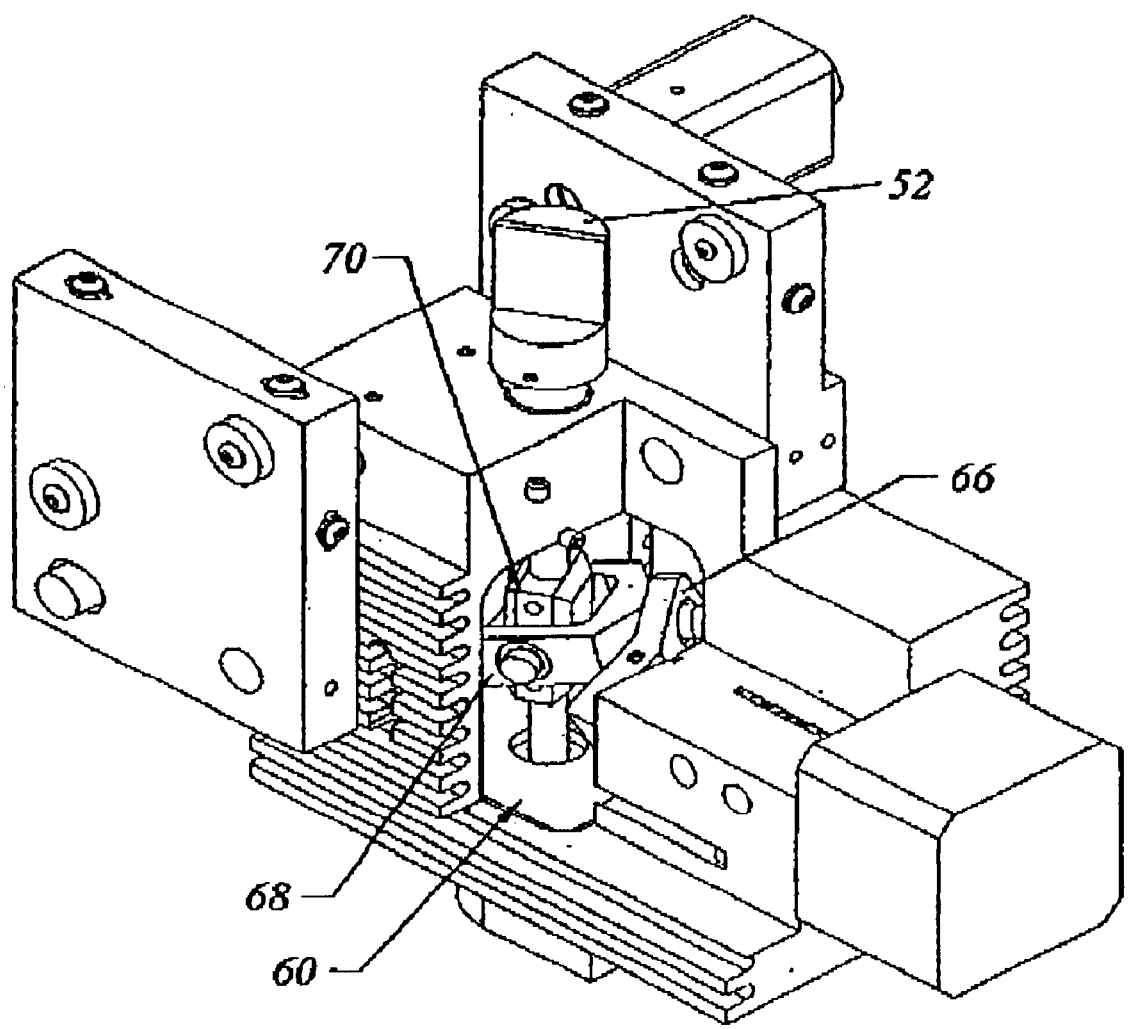
FIG. 10 is a cutaway isometric view of an oscillating mechanism monochromator in a fourth position, showing clockwise input rotation, according to the invention.

FIG. 10 is a cutaway isometric view of an oscillating mechanism monochromator in a fourth position, showing clockwise input rotation, according to the invention. In FIG. 10, it can be seen that continued rotation of the motor shaft is translated by the spatial mechanism to further rotation of the grating in the first direction.

Figure 11:
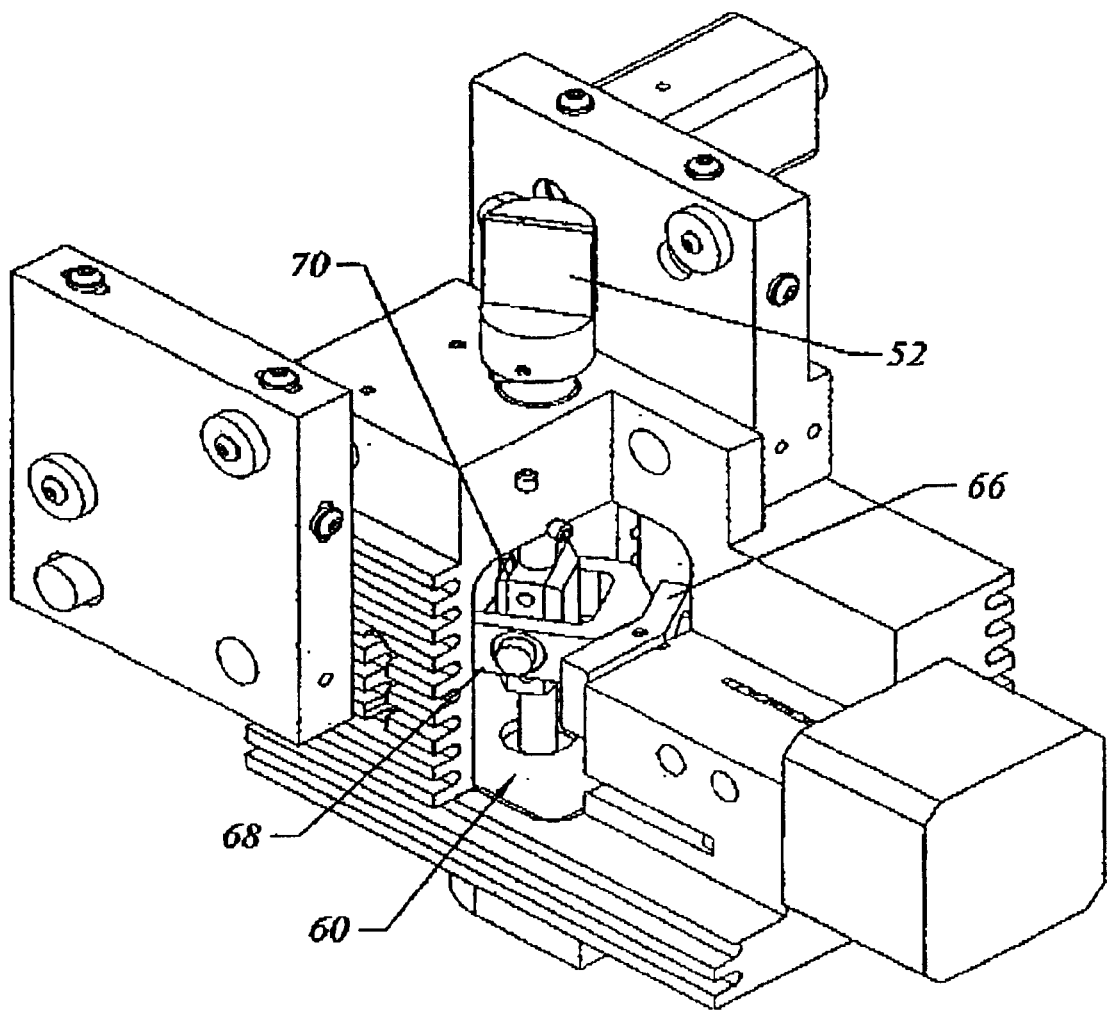
FIG. 11 is a cutaway isometric view of an oscillating mechanism monochromator in a fifth position, showing clockwise input rotation, one scan complete, according to the invention.

FIG. 11 is a cutaway isometric view of an oscillating mechanism monochromator in a fifth position, showing clockwise input rotation, one scan complete, according to the invention. In FIG. 11, it can be seen that the motor shaft coupler is again in a substantially horizontal position, as is the link. The motor shaft has now rotated 180 degrees and completed a scan of the grating in the first direction. As discussed below, the next 180 degrees of motor shaft rotation scan the grating in a second, opposite direction. Key to the invention is the smooth and continuous translation of motor shaft rotation to drive shaft oscillation. The mechanism herein described performs such translation in a manner that preserves the angular momentum of the grating, such that a nearly ideal sinusoidal scan is provided. The invention also eliminates mechanical backlash that occurs when the motor direction is reversed in the prior art drive mechanisms.

Figure 12:
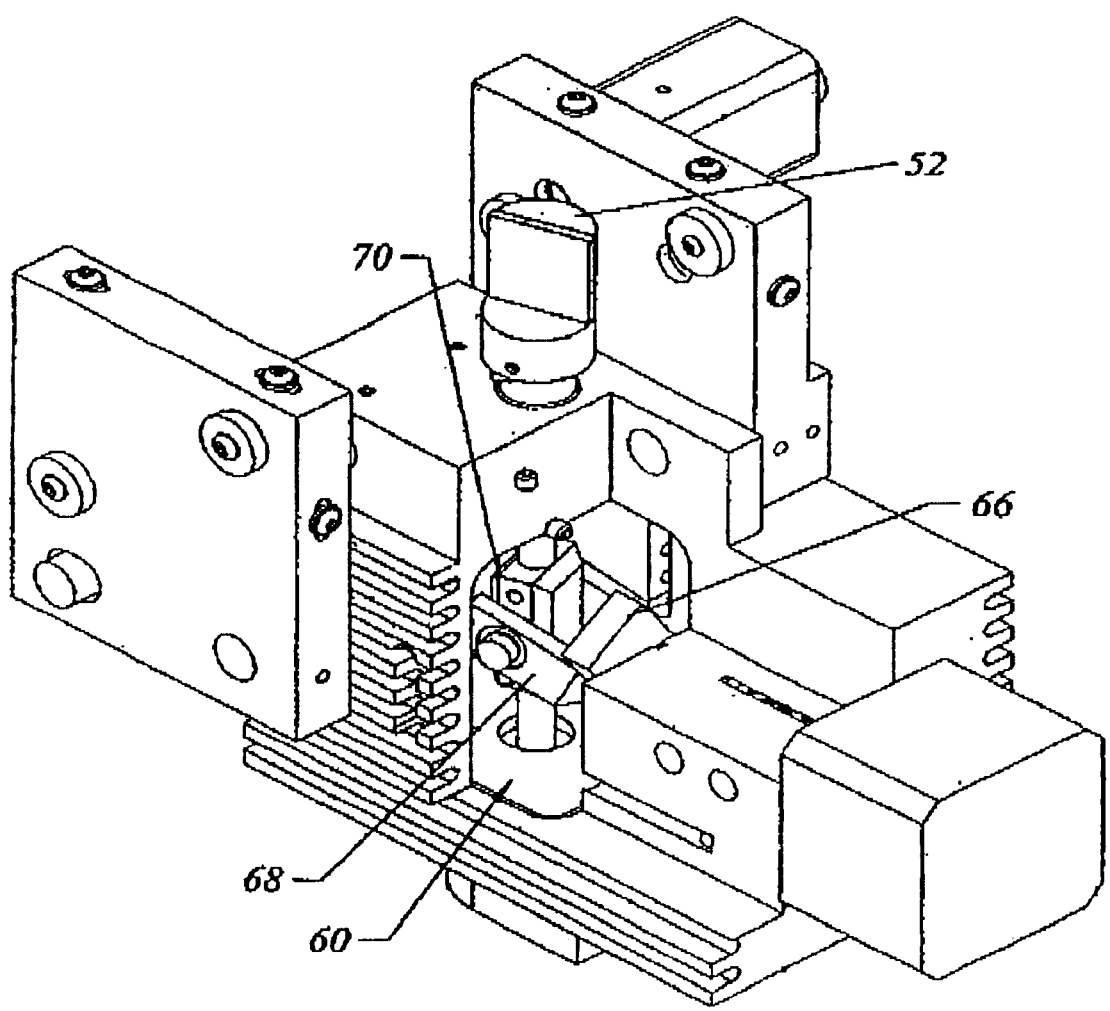
FIG. 12 is a cutaway isometric view of an oscillating mechanism monochromator in a sixth position, showing clockwise input rotation, according to the invention.

FIG. 12 is a cutaway isometric view of an oscillating mechanism monochromator in a sixth position, showing clockwise input rotation, according to the invention. In FIG. 12, it can be seen that continued rotation of the motor shaft coupler pushes the link downwardly, thereby pulling the drive shaft coupler in an opposite direction from that in which it was previously pulled. This scans the grating in the opposite direction for a second scan of a scan cycle.

Figure 13:
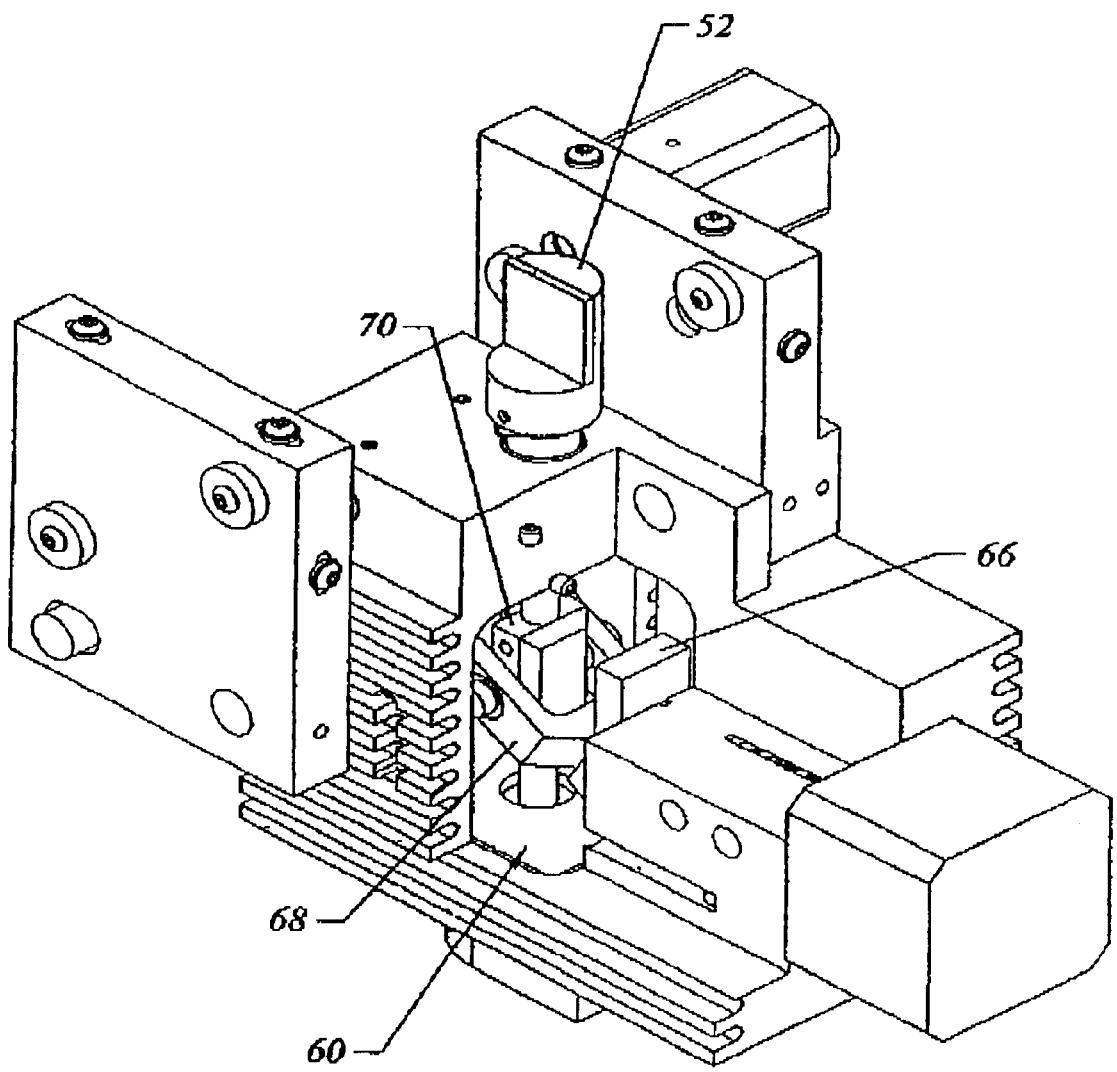
FIG. 13 is a cutaway isometric view of an oscillating mechanism monochromator in a seventh position, showing clockwise input rotation, according to the invention.
Figure 14:
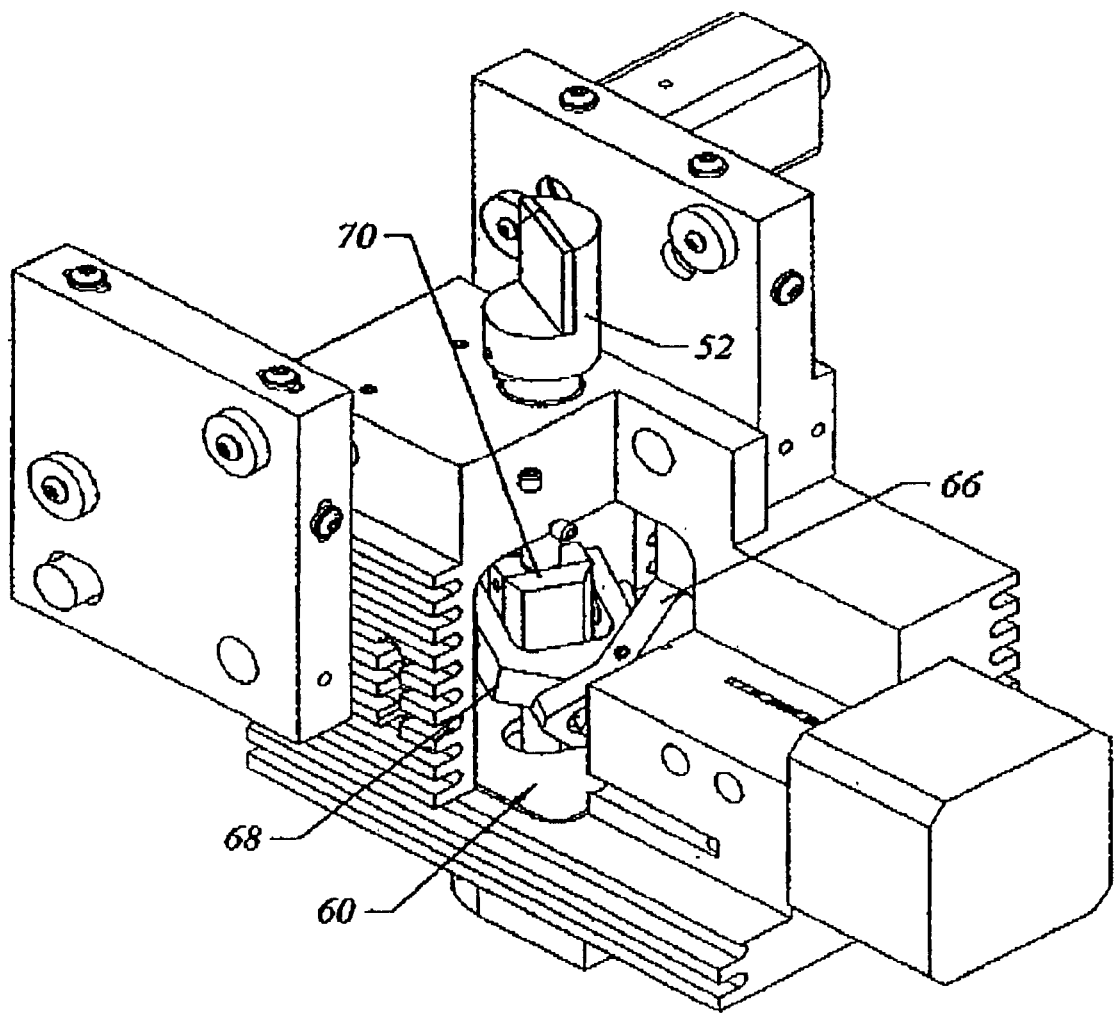
FIG. 14 is a cutaway isometric view of an oscillating mechanism monochromator in an eighth position, showing clockwise input rotation, according to the invention.
Figure 15:
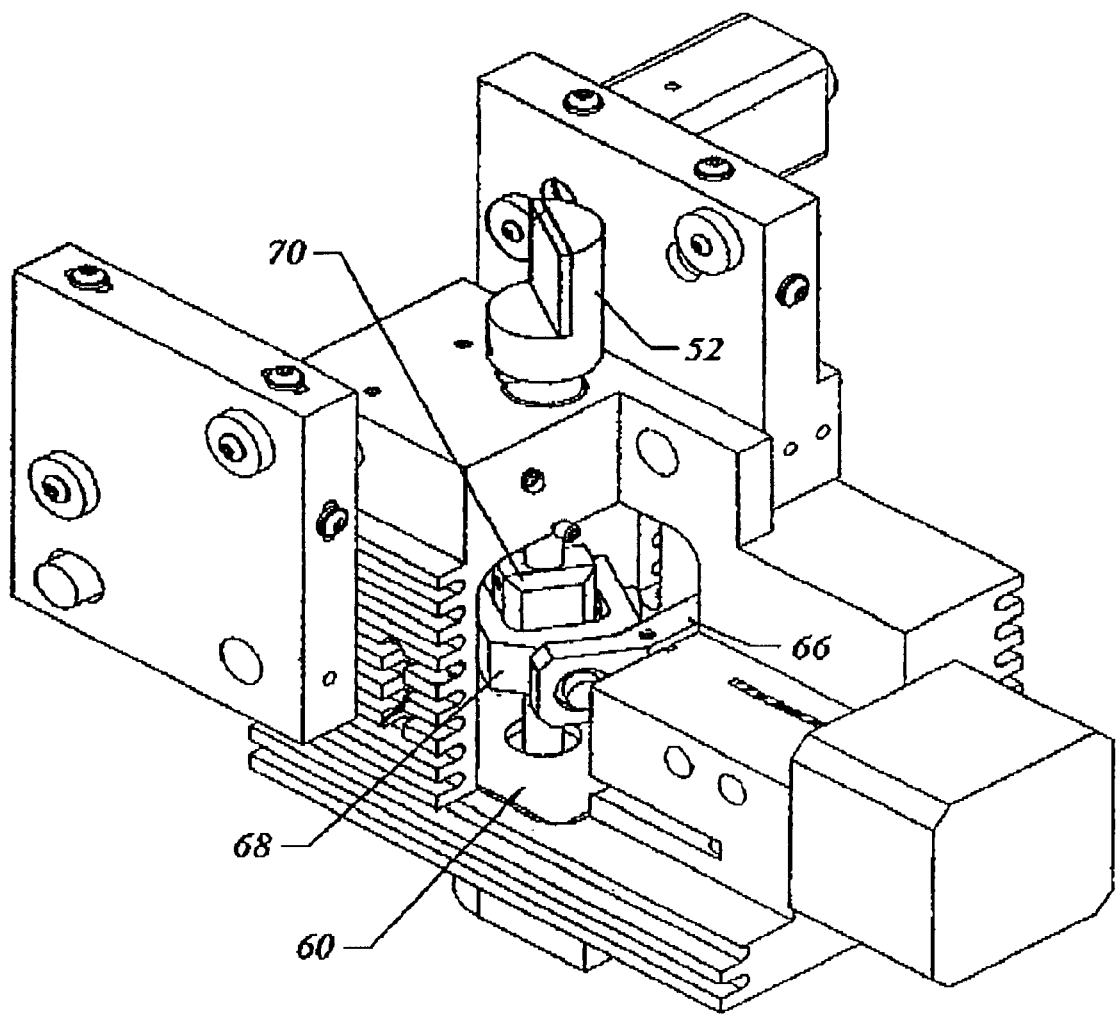
FIG. 15 is a cutaway isometric view of an oscillating mechanism monochromator in a ninth position, showing clockwise input rotation, second scan complete, according to the invention.

FIG. 13 is a cutaway isometric view of an oscillating mechanism monochromator in a seventh position, showing clockwise input rotation, according to the invention. FIG. 14 is a cutaway isometric view of an oscillating mechanism monochromator in an eighth position, showing clockwise input rotation, according to the invention. FIG. 15 is a cutaway isometric view of an oscillating mechanism monochromator in a ninth position, showing clockwise input rotation, second scan complete, according to the invention. In FIGS. 13–15, it can be seen that continued rotation of the motor shaft coupler pulls the link such that the grating is rotated back to its initial position. Continuous rotation of the motor shaft by the motor is thus transformed to an oscillating movement of the grating by the spatial mechanism.

It should be noted that various velocity profiles can be imparted to the motor to produce desired output velocity profiles for the grating. One example of a desired output velocity profile is a constant velocity profile of the grating throughout its oscillation angle. In such arrangment, velocity is only limited at the position which the grating rotation changes direction, where the angular velocity is zero.

In another embodiment of the invention, an optical encoder (not shown), placed opposite to the grating, is coupled to the drive shaft coupler of the spatial mechanism to define the postion of the grating. Information concerning the grating position may then be coordinated with other information concerning the operation of the monochromator, e.g. with control information for operation of the light source.

Other methods of determining the position of the grating may also be incorporated into the mechanism. One such method analytically determines the position of the grating using the geometry of the spatial mechanism and the known angular position of the motor, e.g. by counting steps or by coupling an encoder to the motor shaft. The encoder discussed above can be directly coupled to the drive shaft coupler of the spatial linkage mechanism to measure the angular position of the grating directly and accurately.

In another embodiment of the invention, the motor shaft complex is used in the spatial mechanism as a harmonic balancer and a balancer on the motor shaft.

Further, the extent of a grating scan may be adjusted for different applications by providing adjustable elements in the spatial mechanism. For example, the motor shaft coupler may define a slot instead of an aperture, along which a bushing may be positioned to increase or decrease, as desired, the extent to which the motor shaft coupler pulls the link (and therefore the drive shaft coupler) from side to side during each rotation of the motor shaft.

Other embodiments of the invention include a spatial mechanism that is arranged to produce multiple oscillations per input rotation. In this embodiment of the invention, the spatial mechanism disclosed above is replaced with a mechanism for producing multiple oscillation (forward and reverse) cycles per input revolution.

Another embodiment of the invention produces a fractional oscillation per input rotation. In this embodiment of the invention, the mechanism discussed above is replaced with a mechanism for producing a fraction of an oscillation (forward and reverse) cycle per input revolution.

As discussed above, the preferred embodiment of the invention provides a spatial mechanism for oscillating a ruled spectral grating the invention is readily used with any type of grating, such as a holographic grating or multiple gratings may be used. For example, a plurality of gratings may be coupled to the same drive shaft coupler of the spatial linkage mechanism to allow them to be rotated with the same (or offset) angular position. Further, the herein disclosed spatial mechanism may be used to oscillate a prism. The spatial mechanism may also be used in a monochromator having a fixed grating and an oscillating mirror, where the mirror is coupled to the spatial linkage mechanism in the manner disclosed in the preferred embodiment.

Although the invention is described herein with reference to the preferred embodiment, one skilled in the art will readily appreciate that other applications may be substituted for those set forth herein without departing from the spirit and scope of the present invention. For example, the herein described mechanism may be used in any field requiring the use of a monochromator. Accordingly, the invention should only be limited by the claims included below.

What is claimed is:

1. An apparatus for oscillating a spectral dispersing element of a monochromator, comprising:
 a spatial linkage mechanism for accepting a rotational input from a motive source and converting said rotational input into an oscillatory motion, said spatial linkage mechanism comprising:
 a first coupler for receiving said rotational input directly from said motive source, said first coupler rotating in accordance therewith;
 a link coupled to said first coupler; and
 a second coupler coupled to said link;
 wherein said link translates said rotational input of said motive source, as supplied thereto by said first coupler, to said oscillatory motion; said link imparts said oscillatory motion to said second coupler, and said second coupler oscillates said spectral element.

2. The apparatus of claim 1, wherein said first coupler defines an aperture that is rotated off axis from a rotational axis of said motive source.

3. The apparatus of claim 2, said link further comprising:
 a projection that is formed on said link and that is adapted for engagement with the aperture of said first coupler, wherein said projection and said aperture are arranged to move freely, one relative to the other.

4. The apparatus of claim 1, wherein said first coupler is bent away from said motive source at a predetermined angle.

5. The apparatus of claim 3, further comprising:
 a bushing or bearing for reducing friction between said link and said first coupler at a projection/aperture interface.

6. The apparatus of claim 1, wherein said link comprises a U-shaped member.

7. The apparatus of claim 1, wherein said link defines an aperture in each of two projecting segments, and wherein said link is configured to receive opposing, cylindircal projections that are formed on said second coupler.

8. The appartus of claim 1, wherein said first coupler is affixed to, or formed integrally with, a spectral element drive shaft.

9. The apparatus of claim 7, further comprising:
 a bushing or bearing for reducing friction between said link and said second coupler at a projection/aperture interface.

10. The apparatus of claim 1, wherein said spatial linkage mechanism oscillates said spectral element through one complete forward and reverse cycle for every one revolution of a shaft of said motive element.

11. The apparatus of claim 1, wherein the geometry of said spatial mechanism determines the number of oscillations of said spectral element per input revolution and the angle of oscillation.

12. The apparatus of claim 1, wherein 180 degrees of rotational input completes a first scan of said spectral element in a first direction; and wherein a next 180 degrees of rotational input completes a second scan of said spectral element in a second, opposite direction.

13. The apparatus of claim 1, wherein any of a plurality of velocity profiles can be imparted to said motive source to produce a desired output velocity profile for said spectral element.

14. The apparatus of claim 13, wherein said output velocity profile is a constant velocity profile of said spectral element throughout an oscillation angle.

15. The apparatus of claim 1, further comprising:
    an optical encoder for defining the postion of said spectral element.

16. The apparatus of claim 1, wherein the position of said spectral element is analytically determined by the geometry of said spatial mechanism and a known angular position of said motive source.

17. The apparatus of claim 16, wherein said analytical determination is made by any of counting steps, coupling an encoder to said motive source, and directly coupling to said second coupler to measure the angular position of said spectral element.

18. The appartus of claim 1, wherein said first coupler defines a slot along which a bushing may be positioned to increase or decrease, as desired, the extent to which said first coupler pulls said link from side to side during each rotation of said rotational input.

19. The apparatus of claim 1, wherein said spatial linkage mechanism is adapted to produce multiple oscillations during each rotation of said rotational input.

20. The apparatus of claim 1, wherein said spatial linkage mechanism is adapted to produce a fractional oscillation during each rotation of said rotational input.

21. The apparatus of claim 1, wherein said spectral element comprises any of a ruled spectral grating, a holographic grating, multiple gratings in which a plurality of gratings are coupled to a same output of said spatial linkage mechanism to allow said grating to be rotated with a same (or offset) angular position, and a prism.

22. The apparatus of claim 1, wherein said spatial linkage mechanism is used in a monochromator having a fixed spectral element and an oscillating mirror, wherein the mirror is coupled to said spatial linkage mechanism.

23. The apparatus of claim 1, wherein said first coupler further comprises a harmonic balancer.

24. An apparatus for oscillating a spectral element of a monochromator, comprising:
    a spatial linkage mechanism for accepting a rotational input from a motive source and converting said rotational input into an oscillatory motion, said spatial linkage mechanism comprising:
        a first coupler for receiving said rotational input, said first coupler rotating in accordance therewith, wherein said first coupler defines an aperture that is rotated off axis from a rotational axis of said motive source, wherein said first coupler is affixed to, or formed integrally with, a spectral element drive shaft;
        a link coupled to said first coupler, said link further comprising a projection that is formed on said link and that is adapted for engagement with the aperture of said first coupler, wherein said projection and said aperture are arranged to move freely, one relative to the other, wherein said link comprises a U-shaped member, wherein said link defines an aperture in each of two projecting segments, and wherein said link is configured to receive opposing, cylindircal projections that are formed on said second coupler; and
        a second coupler coupled to said link;
        wherein said link translates said rotational input of said motive source, as supplied thereto by said first coupler, to said oscillatory motion; said link imparts said oscillatory motion to said second coupler, and said second coupler oscillates said spectral element.

25. The apparatus of claim 24, wherein said spatial linkage mechanism oscillates said spectral element through one complete forward and reverse cycle for every one revolution of a shaft of said motive element.

26. The apparatus of claim 24, wherein said spatial linkage mechanism is adapted to produce multiple oscillations during each rotation of said rotational input.

27. The apparatus of claim 24, wherein said spatial linkage mechanism is adapted to produce a fractional oscillation during each rotation of said rotational input.

28. The apparatus of claim 24, wherein said spectral element comprises any of a ruled spectral grating, a holographic grating, multiple gratings in which a plurality of gratings are coupled to a same output of said spatial linkage mechanism to allow said grating to be rotated with a same (or offset) angular position, and a prism.

29. The apparatus of claim 24, wherein said spatial linkage mechanism is used in a monochromator having a fixed spectral element and an oscillating mirror, wherein the mirror is coupled to said spatial linkage mechanism.

* * * * *